United States Patent
Norton, Jr. et al.

(10) Patent No.: US 12,204,428 B2
(45) Date of Patent: Jan. 21, 2025

(54) SECURE TRANSIT MODE FOR ELECTRONIC DEVICE

(71) Applicant: LENOVO (SINGAPORE) PTE. LTD, Singapore (SG)

(72) Inventors: Robert James Norton, Jr., Raleigh, NC (US); Justin Michael Ringuette, Morrisville, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/746,047

(22) Filed: May 17, 2022

(65) Prior Publication Data

US 2023/0376396 A1    Nov. 23, 2023

(51) Int. Cl.
| | |
|---|---|
| *G06F 11/30* | (2006.01) |
| *G06F 1/32* | (2019.01) |
| *G06F 1/3206* | (2019.01) |
| *G06F 1/3246* | (2019.01) |
| *G06F 21/60* | (2013.01) |

(52) U.S. Cl.
CPC ........ *G06F 11/3051* (2013.01); *G06F 1/3206* (2013.01); *G06F 1/3246* (2013.01); *G06F 11/3062* (2013.01); *G06F 21/602* (2013.01)

(58) Field of Classification Search
CPC ............ G06F 11/3051; G06F 11/3062; G06F 1/3203; G06F 1/3246; G06F 1/3287; G06F 1/3212; G06F 61/602
See application file for complete search history.

(56) References Cited

U.S. PATENT DOCUMENTS

| | | | | |
|---|---|---|---|---|
| 8,645,735 | B1* | 2/2014 | Ardis | G06F 1/3275 340/541 |
| 8,700,669 | B1* | 4/2014 | Glidewell | G06F 11/0784 711/170 |
| 10,416,753 | B1* | 9/2019 | Lim | G06F 1/3296 |
| 2017/0178069 | A1* | 6/2017 | Paterra | G06F 21/44 |
| 2017/0371394 | A1* | 12/2017 | Chan | G06F 1/3218 |
| 2022/0374130 | A1* | 11/2022 | Pu | G06F 1/3212 |

FOREIGN PATENT DOCUMENTS

| | | | | | |
|---|---|---|---|---|---|
| CN | | 104571456 A | * | 4/2015 | |
| WO | WO-2017004431 A1 | | * | 1/2017 | ......... G06K 19/0723 |

* cited by examiner

*Primary Examiner* — Jaweed A Abbaszadeh
*Assistant Examiner* — Cheri L Harrington
(74) *Attorney, Agent, or Firm* — Schwegman Lundberg & Woessner, P.A.

(57) ABSTRACT

A computer implemented method of preparing an electronic device for transport to a destination includes activating a secure transport function for an electronic device and receiving a selection of at least two transport mode options. The transport mode options may include placing the electronic device in a shipping mode to disconnect a device battery until the device is reconnected to a power adapter, performing an encryption on selected data stored on the device, capturing a connection fingerprint of gateways upon power on during transport, and logging power on hours during transport. The method includes applying, via the secure transport mode function, the selected transport mode operations prior to transport.

18 Claims, 4 Drawing Sheets

| | | HISTORY | | |
|---|---|---|---|---|
| | NAME | ADDRESS | TIME RANGE | DATE |
| 1 | OWNER | XXXX XXXX XX XXXXX | XXXX X | 1-2-20XX |
| 2 | A | XXXX XXXX XX XXXXX | TIME 1 | 1-3-20XX |
| 3 | B | XXXX XXXX XX XXXXX | TIME 1 | 1-3-20XX |
| 4 | C | XXXX XXXX XX XXXXX | TIM 2 | 1-4-20XX |
| 5 | | | | |
| ⋮ | ⋮ | ⋮ | ⋮ | ⋮ |
| N | DEST. | XXXX XXXX XX XXXXX | XXXX X | 1-6-20XX |

SECURE TRANSIT MODE FOR ELECTRONIC DEVICE

BACKGROUND

Electronic devices, such as laptop computers and phones can be returned by customers for many different reasons, such as disposal, updating, repair, and other reasons. Managing the return of such devices in a secure manner may referred to as asset recovery services, or ARS. The devices may be packaged on a pallet and include physical locking devices in addition to normal access security provided by the devices themselves. These security measures are insufficient to prevent against a determined entity from stealing devices during transit and using many different means of accessing sensitive data that may be stored on the devices, such as by disassembly.

SUMMARY

A computer implemented method of preparing an electronic device for transport to a destination includes activating a secure transport function for an electronic device and receiving a selection of at least two transport mode options. The transport mode options may include placing the electronic device in a shipping mode to disconnect a device battery until the device is reconnected to a power adapter, performing an encryption on selected data stored on the device, capturing a connection fingerprint of gateways upon power on during transport, and logging power on hours during transport. The method includes applying, via the secure transport mode function, the selected transport mode operations prior to transport.

DETAILED DESCRIPTION

Figure 1:
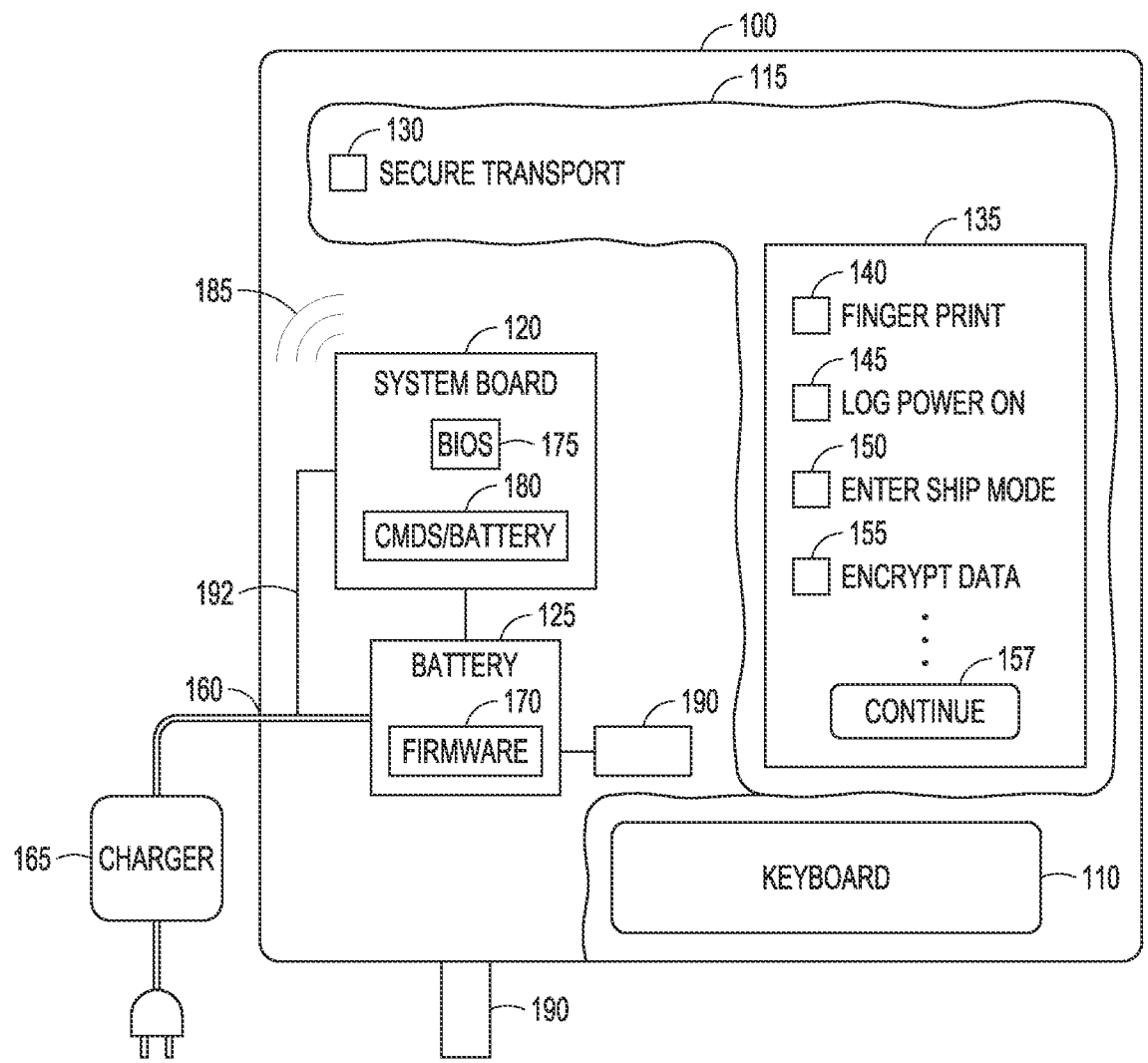
FIG. 1 is a block diagram representation of a device having a secure transport function with selectable options for protecting and monitoring the device during transport according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Security measures for transporting electronic devices such as computers storing customer sensitive data can be lacking. While palletization and locking measure may be employed, it is still possible for a bad actor to intercept and access the devices during transport. Upon receipt at a destination, the access that occurred may not be detectible, leaving the potential for customer data to have been breached without knowledge of the breach having occurred.

Customers may not know to take steps to prevent nefarious use of the breached customer data.

A secure transport mode function enables users to protect electronic devices during transport to a destination. The destination may be a manufacturer or distributor of electronic devices performing asset recovery. Asset recovery may be performed for a variety of situations, such as updates, repair, or scrapping. It is important that the data on assets being recovered is protected.

The secure transport function in one example enables a user to select two or more transport function mode options for execution prior to shipping the device. Example transport function mode options include placing the electronic device in a shipping mode to disconnect a device battery until the device is reconnected to a power adapter, performing an encryption on selected data stored on the device, capturing a Connection fingerprint of connections, such as wireless local area network (WLAN), wireless wide area network (WWAN), and Bluetooth gateways upon power on during transport, and logging power on hours during transport. The selected options are applied via the secure transport mode function just prior to transport.

Upon receipt at the destination, data collected via some of the selected options may be provided to detect whether or not unauthorized access to the device was attempted during transport.

FIG. 1 is a block diagram representation of a device 100 having a secure transport function with selectable options for protecting and monitoring device 100 during transport. Device 100 may be an electronic device that can process information, such as a laptop device, tablet, or smart phone.

In one example, device 100 includes a keyboard 110 and a display 115. Display 115 is shown cut away to illustrate that device 100 includes electronics, such as a system board 120 and a battery 125 for providing power to the device. Display 115 is shown displaying a secure transport mode function checkbox 130, which when selected, causes display of multiple transport mode options 135.

The transport options in one example include connection fingerprint 140, log power on 145, enter ship mode 150, and encrypt data 155, and may be selected via respective checkboxes. While checkboxes are shown and described as a means for selecting functions and options, other user interface constructs may be used, such as clicking on words or icons associated with the functions or options to select the function or option. The options may be highlighted upon selection to provide a user perceivable indication that an option has have been selected. Upon completion of selecting the options, a user may select to continue 157 to cause execution of the options.

Device 100 may also include additional components such as a charging port 160 or coupling the battery 125 to an AC adapter, referred to as charger device 165. Battery 125 may also include firmware 170. System board 120 or other electronics of device 100 may include a BIOS 175 and circuitry, such as CMOS circuitry that is powered by a separate battery 180. System board 120 may also include a wireless transceiver 185. The additional components of device 100 may be used in implementing one or more of the selected options 135.

In one example, the ability to select the transport options 135 may be initiated by navigating from the start menu to a settings menu that includes the ability to select the secure transport mode function such as checkbox 130. A command may be used to reach a bios setup menu. In further examples, a physical switch may be selected, or a combination of keys, a series of button presses such as power key held in while pressing the esc key multiple times. In response, the device 100 can prompt the user for entering secure transit mode and initiate display of the transport options 135 or even straight into pre-selected transport options.

A separate device, such as a USB device 190 may be plugged into a port on device 100. The device 190 may include script to put device 100 into the transport mode with preselected options or cause the display of options. The separate device 190 may use a trusted device handshake and boot the device 100 into the secure transit mode.

To take the device out of the transport mode, depending on options selected, a separate USB device may be utilized, or the device 100 may be coupled to the charger 165.

The connection fingerprint option 140 captures and stores a record of all known WLAN, WWAN, and Bluetooth gateways that are detected upon powering on device 100. The record is accessible to a device administrator. In one example, a snapshot of every gateway within range is captured and saved on non-volatile memory. In one example, the snapshot may be sent to the administrator via a connection that may be established during transport or on receipt at the destination.

Figures 2, 3:
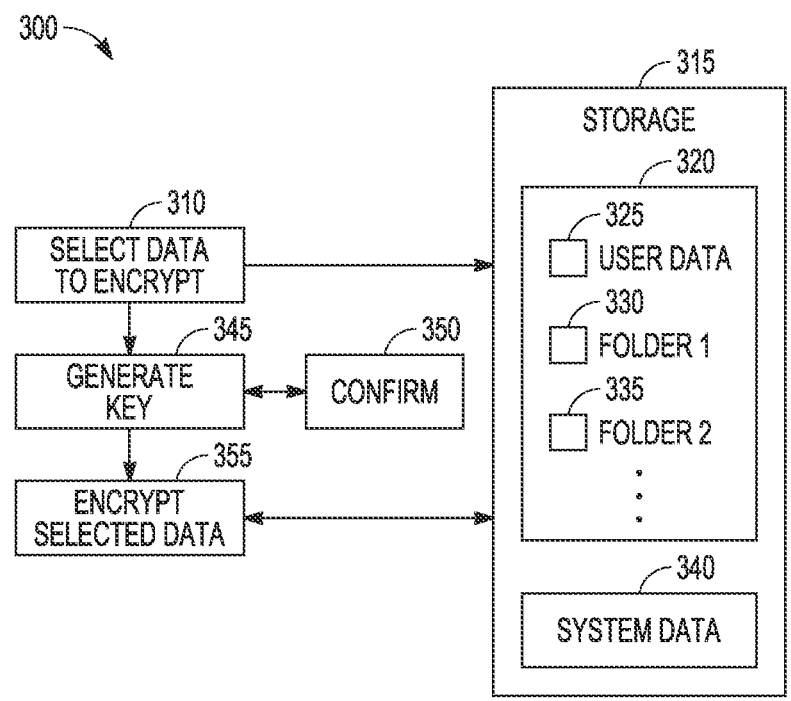
FIG. 2 is an example, of a history or record of detected available connections or connections made, such as gateways during transport according to an example embodiment.
FIG. 3 is a block diagram illustrating operation of the encrypt data option according to an example embodiment.

FIG. 2 is an example, of a history or record 200 of detected available connections or connections made, such as gateways during transport. The record 200 may include a connection name 210, address 215 (such as an IP address), time range 220 that identifies the beginning and end of time that the connection was within range or actually connected and a date 225. In example record 200, a first row 230 identifies an owner/user connection that was connected at the time transport mode was entered. A final row 235 identifies a destination connection that was within range at the time device 100 is turned on to inspect transport events that may have occurred. The rows may be organized by date and time, name, or any other desired column values.

Record 200 also indicates that during transport, three connections were detected at rows 240, 245, and 250. Rows 240 and 245 indicate that one day after transport began, a device power on event must have occurred as the device detected gateways A and B within range. The event is indicative of a first bad actor having accessed the device. Row 250 indicate that one day later, the device was accessed again, resulting in detection of gateway C. Two days later, the device reached its destination. The record 200 indicates that two separate events occurred. The IP addresses and names of the gateways may provide information for investigation to help identify the bad actor or bad actors responsible for the events.

Connections may pertain to both connections to Wi-Fi networks, a form of WLAN, and connections to other non-Wi-Fi networks, such as Bluetooth networks, ethernet networks, connection between a user device and an automated teller machine (ATM), and connection between two user devices via near-field communication (NFC). Another example is connection to another device via a virtual private network (VPN). In this regard, a network connection may be a connection for communication between only two devices such as a smart phone and vehicle via Bluetooth, or a connection for communication with more than two devices such as might occur when connecting to a Wi-Fi network to browse Internet websites.

The log power on option 145 cause logging of power on hours in response to the option being executed. In one example, an existing BIOS feature may be used to log the power on hours. Turing on BIOS feature makes use of the CMOS battery 180 to power CMOS circuitry on the system board 120 to keep time as well as detecting powering the device 100 on and off. The logged power on and off data may be stored on non-volatile storage on the system board 120 even if the main battery 125 is disconnected via a different option. The logged power on and off data may then be obtained by the administrator at the destination to determine whether or not the device 100 was powered on by a bad actor during transport.

The enter ship mode option 150 may utilize an existing ship mode function of the device 100. The ship mode function disables the main, onboard, battery 125 until an AC adapter such as charger 165 is plugged into charging port 170, which may include a sensing device to determine a charger has been connected to the port. A line 192 communicates the sensed connection and provides an indication to the system board 120, which takes the device out of ship mode, reconnecting the battery 125 to power the system board and other electronic components of device 100. Battery 180 may be used to process the indication to effect the exit from ship mode.

The ship or shipping mode function is used for reducing battery consumption by cutting off the current path to the device 100 at its OFF state. Battery powered portable devices use this or a similar function to suppress the battery power consumption after manufacturing until delivery to the end user. The ship mode function may be entered by flipping a hit via a BIOS setting that disables the battery discharge via a switch, such as an PET, and reenables battery discharge when connected to charger 165. In one example, ship mode may be enabled using the F1 key and selecting Setup→Config→Power→Disable Internal Battery. This same sequence may be performed by selecting enter ship mode 150 from options 135 and selecting continue 157, or as part of a preselected set of options used when selecting to enter secure transit mode using preselected options.

The ship mode function may utilize battery 125 firmware 170 to monitor and log internal data, such as cell voltage and cumulative count of power on time such as by hour or minute. Disconnecting the battery from the remainder of system 100 does not disrupted the powering of the firmware 170 which is integrated with the battery 125. A counter field may be incremented continuously. The count is captured at time secure transit mode entered. A serial number of battery may also be stored to ensure that the same battery is in place at the destination. This may help detect if the battery was replaced in order for a bad actor to gain access during transport. The firmware 170 may also monitor and store information from any installed tamper switch or switched indicated at 197.

FIG. 3 is a block diagram illustrating operation of the encrypt data option 155 generally at 300. The encrypt data option 155 may be selected and executed to perform a base level encryption on selected data previously identified by the user. The encrypt data option may be selected at 310 and generate a view of storage 315 with options 320 to select one or more areas of storage, such as user data 325 or various user folders 330 and 335 which may contain sensitive data. Rather than encrypting the entire storage 310, which also includes system data 340, the user can select either all of the user data, or only selected portions of user data that are known to contain sensitive information that the user would not like exposed to bad actors. The ability to select selected portions results in much less work and time being required to encrypt the smaller amount of data. Encryption of the selected data may be a better option that reformatting or otherwise destroying data to protect form access during transport. Reformatting can take more time and may not be effective. Destroying the data results in loss of unbacked up data. Encryption provides protection without loss of the data.

In one example, the selection of transport mode may default to the user data 325 which may include an entire user directory or folder. In other examples the user may have previously selected storage areas to protect. In still other examples, selection of the encrypt data option 157 may result in display of the encrypt options 320 for selection by the user.

A decryption key may be generated at 345 on entering the encryption option in the secure transport mode. A pseudo random key may be generated to encrypt using a symmetric or asymmetric key. The key may be sent to receiver/destination of the device 100, optionally using a handshake to ensure the key has been received at the destination prior to encrypting the information.

In one example, the USB device 190 may store the key and automatically check to confirm at that the key works. The USB device 190 may be sent separately, or the key may be sent separately to the destination. On confirmation that the key works or that the key has been received at the destination, the selected data is encrypted at 355.

Other options may be selected in further examples, such as ensuring that a tamper switch has been set. Upon receipt at the destination, the tamper switch, or data captured from the tamper switch may be inspected to determine if the tamper switch was tripped. A bad actor may have simply removed the storage 315, such as a disk drive or solid-state drive. The tamper switch may detect such acts.

Figure 4:
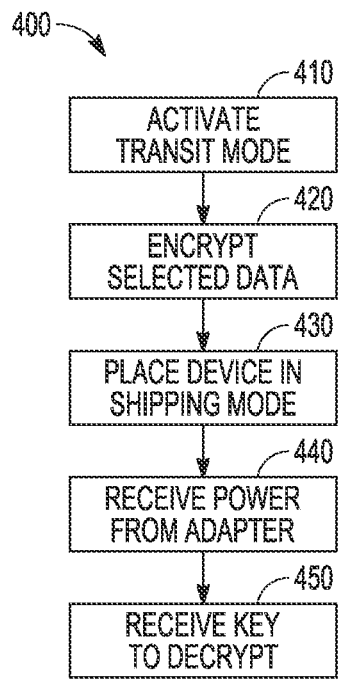
FIG. 4 is a flowchart of a computer implemented method of preparing an electronic device for transport to a destination according to an example embodiment.

FIG. 4 is a flowchart of a computer implemented method 400 of preparing an electronic device for transport to a destination. Method 400 starts at operation 410 by activating a secure transport function for an electronic device. An encryption is performed on selected data stored on the device at operation 420. The electronic device is placed in a shipping mode at operation 430 to disconnect a device battery until the device is reconnected to a power adapter. Upon receipt at the destination, at operation 440, power is received from a power adapter. A key is received or used to decrypt the selected data at operation 450.

In one example, method 400 also includes monitoring and logging power-on hours via a device battery function during transport and providing the log for inspection at the destination to determine power-on information during transport.

Figure 5:
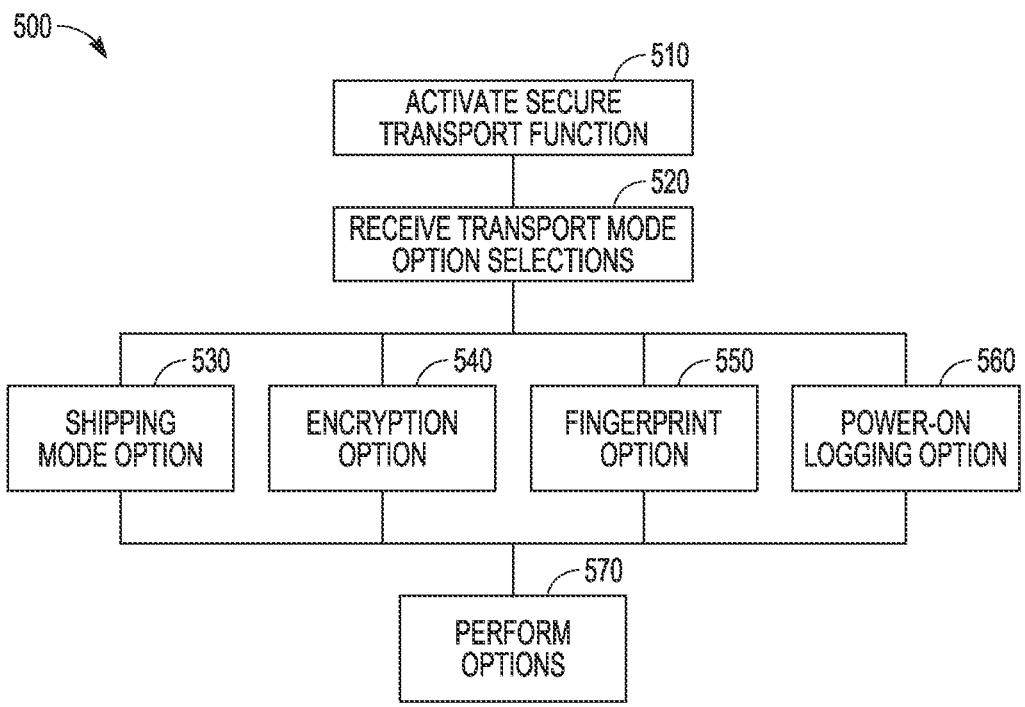
FIG. 5 is a flowchart of a computer implemented method of preparing an electronic device for transport to a destination according to an example embodiment.

FIG. 5 is a flowchart of a computer implemented method 500 of preparing an electronic device for transport to a destination. Method 500 starts at operation 510 by activating a secure transport function for an electronic device. At operation 520, a selection of at least two transport mode options is received. The options may be selected from the group consisting of placing the electronic device in a shipping mode to disconnect a device battery until the device is reconnected to a power adapter at 530, performing an encryption on selected data stored on the device at 540, capturing a connection fingerprint of gateways upon power on during transport at 550. and logging power on hours during transport at 560. At operation 570, the elected transport mode options are performed via the secure transport mode function prior to transport.

The various options are designed to both protect data and to detect that data has been accessed during transport. The fingerprint and log power-on options are directed toward detecting that data has been accessed. The ship mode and encryption options are directed toward protecting data. The ability to select from the multiple options allows users and administrators to design protection commensurate with the sensitivity or value of the data stored on devices to be recovered via transport. The use of the various options significantly decreases the risk of data breach during asset recovery operations and may lower the need for pickup insurance. The protection provided may help meet security requirements that may be more stringent in healthcare applications where data security is paramount.

Figure 6:
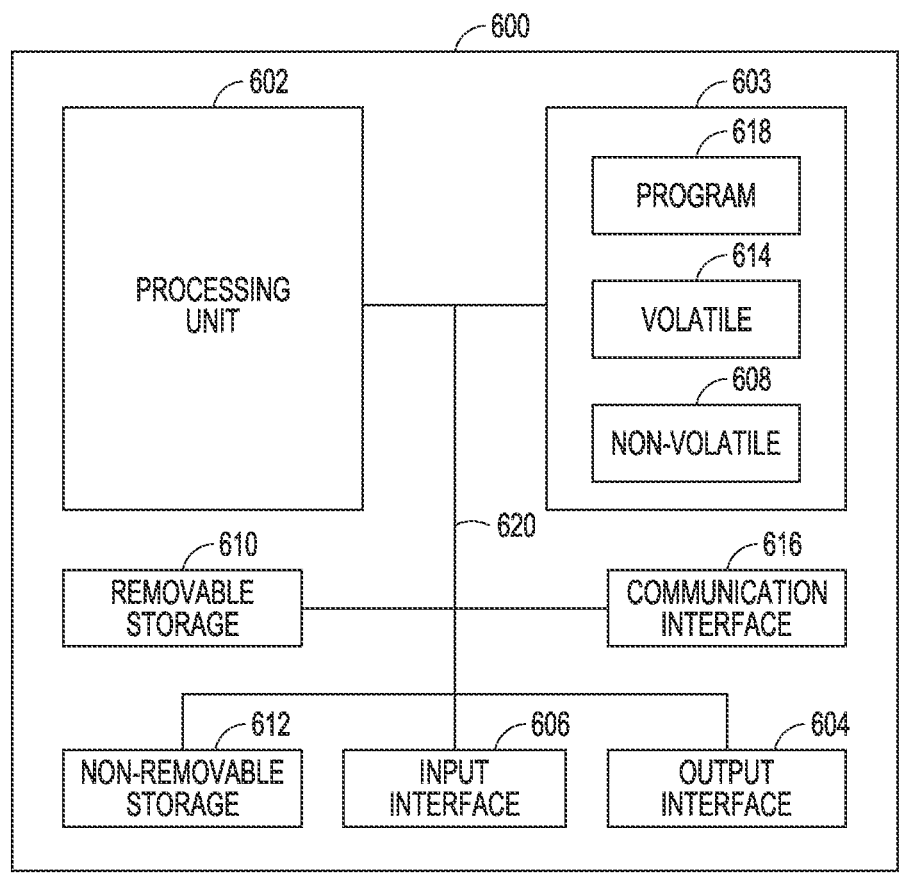
FIG. 6 is a block schematic diagram of a computer system to implement one or more example embodiments.

FIG. 6 is a block schematic diagram of a computer system 600 to perform secure transport functions and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method of preparing an electronic device for transport to a destination, the method includes activating a secure transport function for an electronic device, performing an encryption on selected data stored on the device, and placing the electronic device in a shipping mode to disconnect a device battery until the device is reconnected to a power adapter. Upon receipt at the destination, the method includes receiving power from a power adapter and receiving a key to decrypt the selected data.

2. The method of example 1 and further including monitoring and logging power-on hours via a device battery function during transport and providing the log for inspection to determine power-on information during transport.

3. The method of any of examples 1-2 wherein placing the device in the shipping mode is performed by flipping a bit via a BIOS setting to disable battery discharge via a switch.

4. The method of any of examples 1-3 wherein firmware in the device battery monitors and logs power on times.

5. The method of any of examples 1-4 wherein performing the encryption includes generating a key for decryption, sending the key to the destination, and confirming receipt of the key by the destination prior to performing the encryption.

6. The method of example 5 wherein the key and code for execution to perform the method are stored on separate device for coupling to the electronic device via a port.

7. The method of any of examples 5-6 wherein the selected data includes selected user data.

8. The method of example 7 wherein the user selected data is identified by generating an interface to facilitate selection of user folders.

9. The method of any of examples 1-8 and further including engaging a fingerprint function to capture a connection fingerprint identifying each connection detected upon power-on during transport.

10. The method of example 9 and further including providing the connection fingerprint for inspection at the destination.

11. The method of any of examples 9-10 wherein the fingerprint includes a connection name, IP address, and time for each connection detected.

12. The method of example 11 wherein the connections include wireless local area network (WLAN) connections, wireless wide area network (WWAN) connections, Bluetooth connections, ethernet connections, and near field communication (NFC) connections.

13. A computer implemented method of preparing an electronic device for transport to a destination includes activating a secure transport function for an electronic device and receiving a selection of at least two transport mode options. The transport mode options may include placing the electronic device in a shipping mode to disconnect a device battery until the device is reconnected to a power adapter, performing an encryption on selected data stored on the device, capturing a connection fingerprint of gateways upon power on during transport, and logging power on hours during transport. The method includes applying, via the secure transport mode function, the selected transport mode operations prior to transport.

14. The method of example 13 and further including upon receipt at the destination, providing data collected via the selected options.

15. The method of any of examples 13-14 wherein performing the encryption includes generating a key for decryption, sending the key to the destination, and confirming receipt of the key by the destination prior to performing the encryption.

16. The method of example 15 wherein the key and code for execution to perform the method are stored on separate device for coupling to the electronic device via a port.

17. The method of any of examples 15-16 wherein the selected data comprises selected user data.

18. The method of example 17 wherein the user selected data is identified by generating an interface to facilitate selection of user folders.

19. The method of any of examples 13-18 wherein the fingerprint includes a connection name, IP address, and time for each connection detected and wherein the connections include wireless local area network (WLAN) connections, wireless wide area network (WWAN) connections, and Bluetooth connections, ethernet connections, and near field communication (NFC) connections.

20. A device includes a processor and a memory device coupled to the processor and having a program stored thereon for execution by the processor to perform operations to prepare an electronic device for transport to a destination, the operations comprising:
activating a secure transport function for an electronic device;
performing an encryption on selected data stored on the device;
placing the electronic device in a shipping mode to disconnect a device battery until the device is reconnected to a power adapter; and
upon receipt at the destination; and
upon receipt at the destination:
receiving power from a power adapter; and
receiving a key to decrypt the selected data.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of preparing an electronic device for transport to a destination, the method comprising:
activating a secure transport function for an electronic device;
receiving a selection of data stored on the device to encrypt;
generating a decryption key;
sending the decryption key to the destination;
confirming receipt of the decryption key by the destination prior to performing the encryption;
performing an encryption on the selected data stored on the device;
placing the electronic device in a shipping mode to disconnect a device battery until the device is reconnected to a power adapter; and
upon receipt at the destination:
receiving power at the device from the power adapter; and
receiving the decryption key at the device to decrypt the selected data.

2. The method of claim 1 and further comprising:
monitoring and logging power-on hours via a device battery function during transport; and
providing the log for inspection to determine power-on information during transport.

3. The method of claim 1 wherein placing the device in the shipping mode is performed by flipping a bit via a BIOS setting to disable battery discharge via a switch and wherein the device battery is reconnected in response to receiving power from the power adapter.

4. The method of claim 1 wherein firmware in the device battery monitors and logs power on times.

5. The method of claim 1 wherein the key and code for execution to perform the method are stored on separate device for coupling to the electronic device via a port.

6. The method of claim 1 wherein the selected data comprises selected user data.

7. The method of claim 6 wherein the user selected data is identified by generating an interface to facilitate selection of user folders.

8. The method of claim 1 and further comprising engaging a fingerprint function to capture a connection fingerprint identifying each connection detected upon power-on during transport.

9. The method of claim 8 and further comprising providing the connection fingerprint for inspection at the destination.

10. The method of claim 8 wherein the fingerprint includes a connection name, IP address, and time for each connection detected.

11. The method of claim 10 wherein the connections include wireless local area network (WLAN) connections, wireless wide area network (WWAN) connections, Bluetooth connections, ethernet connections, and NFC connections.

12. A computer implemented method of preparing an electronic device for transport to a destination, the method comprising:
activating a secure transport function for an electronic device;
receiving a selection of data stored on the device to encrypt;
generating a decryption key;
sending the decryption key to the destination;
confirming receipt of the decryption key by the destination prior to performing the encryption;
performing an encryption on the selected data stored on the device;
placing the electronic device in a shipping mode to disconnect a device battery until the device is reconnected to a power adapter; and
upon receipt at the destination:

receiving power at the device from the power adapter; and receiving the decryption key at the device to decrypt the selected data.

13. The method of claim 12 and further comprising:
upon receipt at the destination, providing data collected via the selected options.

14. The method of claim 12 wherein the key and code for execution to perform the method are stored on separate device for coupling to the electronic device via a port.

15. The method of claim 12 wherein the selected data comprises selected user data.

16. The method of claim 15 wherein the user selected data is identified by generating an interface to facilitate selection of user folders.

17. The method of claim 12 wherein the fingerprint includes a connection name, IP address, and time for each connection detected and wherein the connections include wireless local area network (WLAN) connections, wireless wide area network (WWAN) connections, and Bluetooth connections, ethernet connections, and NFC connections.

18. A device comprising:
a processor; and
a memory device coupled to the processor and having a program stored thereon for execution by the processor to perform operations to prepare an electronic device for transport to a destination, the operations comprising:
activating a secure transport function for an electronic device;
receiving a selection of data stored on the device to encrypt;
generating a decryption key;
sending the decryption key to the destination;
confirming receipt of the decryption key by the destination prior to performing the encryption;
performing an encryption on the selected data stored on the device;
placing the electronic device in a shipping mode to disconnect a device battery until the device is reconnected to a power adapter; and
upon receipt at the destination:
receiving power at the device from the power adapter; and
receiving the decryption key at the device to decrypt the selected data.

* * * * *